United States Patent

Ho et al.

[11] Patent Number: 6,067,448
[45] Date of Patent: May 23, 2000

[54] SYSTEM AND METHOD FOR ISOLATING RADIO FREQUENCY SIGNALS

[75] Inventors: Thinh Q. Ho, Anaheim; John W. Rockway, San Diego, both of Calif.

[73] Assignee: The United States of America as represented by the Secretary of the Navy, Washington, D.C.

[21] Appl. No.: 08/813,243

[22] Filed: Mar. 7, 1997

[51] Int. Cl.[7] ............................... H04B 1/44; H04B 1/10
[52] U.S. Cl. ........................... 455/78; 455/63; 455/303; 455/296
[58] Field of Search ................................ 333/12; 455/63, 455/24, 278.1, 303, 304, 454, 296, 78, 82, 305; 375/346, 349

[56] References Cited

U.S. PATENT DOCUMENTS

| | | |
|---|---|---|
| 3,132,339 | 5/1964 | Boughnou . |
| 3,696,429 | 10/1972 | Tressa . |
| 3,810,182 | 5/1974 | White et al. . |
| 4,475,243 | 10/1984 | Batlivala et al. . |
| 4,660,042 | 4/1987 | Ekstrom . |
| 4,952,193 | 8/1990 | Talwar ........................................ 455/63 |
| 5,117,505 | 5/1992 | Talwar ................................. 455/278.1 |
| 5,129,099 | 7/1992 | Roberts ...................................... 455/81 |
| 5,179,728 | 1/1993 | Sowadski ............................. 455/183.1 |
| 5,444,864 | 8/1995 | Smith . |
| 5,574,978 | 11/1996 | Talwar et al. .............................. 455/63 |
| 5,701,595 | 12/1997 | Green, Jr. ................................... 455/83 |
| 5,815,803 | 9/1998 | Ho et al. .................................... 455/78 |
| 5,826,181 | 10/1998 | Reed ......................................... 455/312 |
| 5,982,825 | 10/1999 | Tsujimoto ................................ 375/347 |

OTHER PUBLICATIONS

U.S. application No. 08/614,782, Ho et al., filed Mar. 8, 1996.

*Primary Examiner*—Nguyen Vo
*Assistant Examiner*—Charles N. Appiah
*Attorney, Agent, or Firm*—Harvey Fendelman; Peter A. Lipovsky; Michael A. Kagan

[57] ABSTRACT

A wideband high isolation circulator network reduces or eliminate interference from a nearby RF transmitted signal in a received RF signal. The network includes a first sampler for dividing a first signal into second and third signals; a circulator for receiving the second signal through a first port, for outputting a fourth signal and receiving a fifth signal through a second port, and for outputting a sixth signal through a third port which represents the vector sum of samples of the second and fifth signals; and a signal processing stage which generates a seventh signal having amplitude and phase characteristics representing the fifth signal in response to receiving the third and sixth signals.

11 Claims, 2 Drawing Sheets

SYSTEM AND METHOD FOR ISOLATING RADIO FREQUENCY SIGNALS

BACKGROUND OF THE INVENTION

The present invention generally relates to radio communications systems in which it is desirable to reduce or eliminate interference from a nearby RF transmitted signal in a received RF signal.

There are many applications for radio communications systems in which receivers must be operated near transmitters operating in the same frequency band. Such systems may be found onboard aircraft or ships. A problem arises when a strong signal transmitted by a nearby transmitter overwhelms a weaker signal intended to be detected by the receiver, thereby reducing the sensitivity of the receiver. A need therefore exists for a simple system for isolating a receiver from an adjacent transmitter by a sufficient amount to allow detection of a signal of interest.

SUMMARY OF THE INVENTION

The present invention provides a wideband high isolation circulator network that reduces or eliminate interference from a nearby RF transmitted signal in a received RF signal. The network includes a first sampler for dividing a first signal into second and third signals; a circulatory for receiving the second signal through a first port, for outputting a fourth signal and receiving a fifth signal through a second port, and for outputting a sixth signal through a third port which represents the vector sum of samples of the second and fifth signals; and a signal processing stage which generates a seventh signal having amplitude and phase characteristics representing the fifth signal in response to receiving the third and sixth signals.

The invention may also be characterized as method for isolating a first RF signal from a second RF signal. The method generally includes the steps of dividing a first signal into second and third signals; outputting a fourth signal in response to receiving said second signal; outputting a fifth signal in response to receiving a sixth signal; and generating a seventh signal having amplitude and phase characteristics of said fifth signal in response to receiving said third and sixth signals;

An important advantage of the invention is that it provides a simple solution for the long sought goal of obtaining excellent isolation between a transmitter and an adjacent receiver. This and other advantages will become more readily apparent upon review of the accompanying specification, including the claims, and the drawings.

Throughout the several views, like components are designated using like references.

DESCRIPTION OF THE PREFERRED EMBODIMENT

The following description is of the best mode presently contemplated for implementing the invention. This description is not to be taken in a limiting sense, but is made merely for the purpose of describing the general principles of the invention. The scope of the invention should be determined with reference to the claims.

Figure 1:
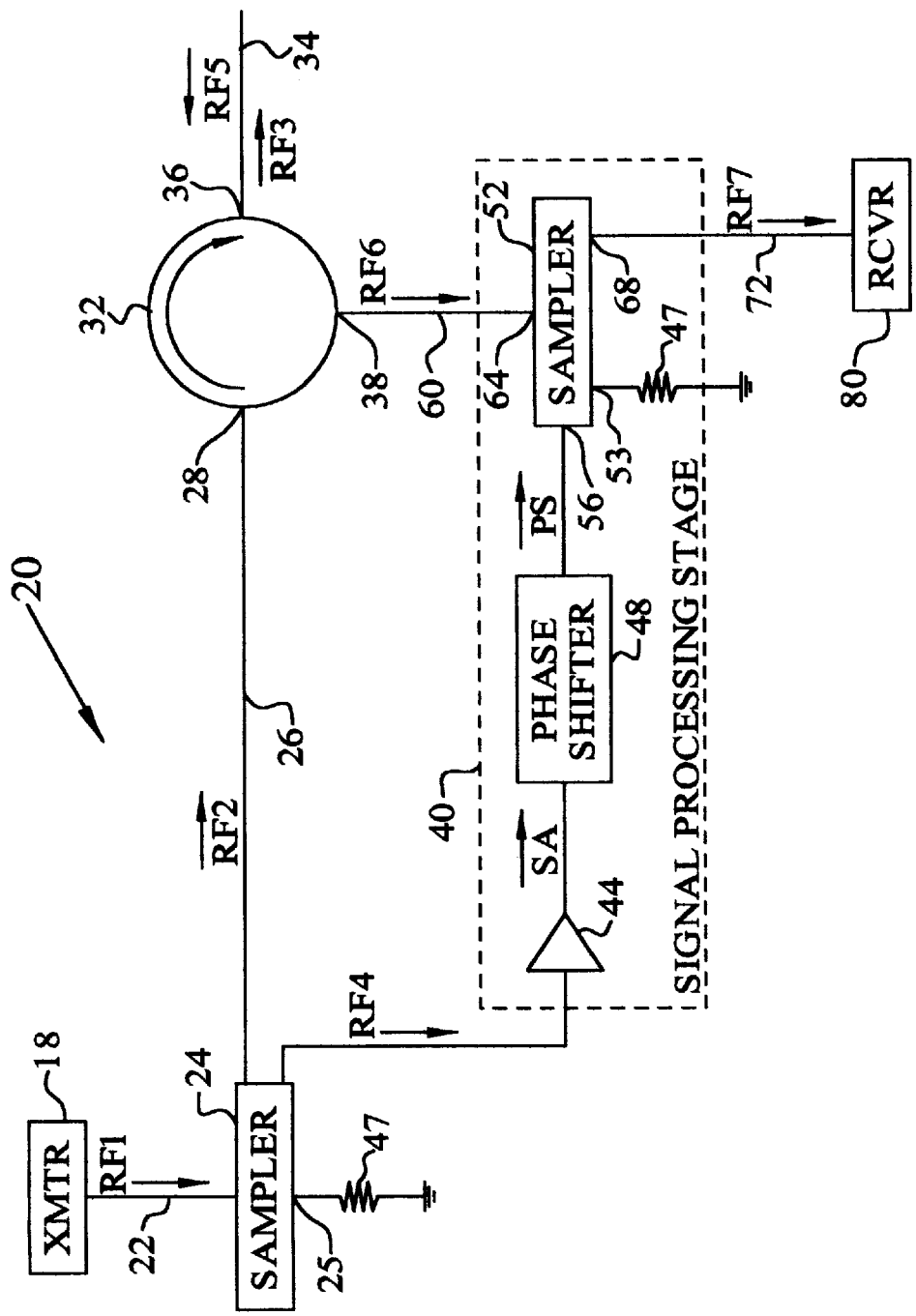
FIG. 1 is a block diagram of a wideband high isolation circulator network embodying various features of the present invention.

Referring to FIG. 1, there is shown a wideband high isolation circulator network 20 embodying various features of the present invention. The network 20 substantially isolates a transmitted signal RF1, generated by transmitter 18, from a received signal RF5 by superimposing a phase and amplitude adjusted signal sampled from the transmitted signal onto the received signal. Destructive interference between samples of the transmitted and received signals provides a signal essentially free of interference from the transmitted signal. The network includes a sampler 24 which divides a radio frequency (RF) input signal RF1 which is directed along propagation path 22 into signals RF2 and sample signal RF4. Preferably the amplitude of RF2 is much greater than the amplitude of RF4. Signal RF2 is directed along propagation path 26 to input port 28 of circulator 32. A circulator is a device with ports arranged so that RF energy entering a port is coupled in one direction to an adjacent port, but not coupled to the other port(s). By way of example, circulator 32 may be implemented as Tekelec Microwave Part No. BB3007 00. Circulator 32 outputs signal RF2 as signal RF3 through port 36 along propagation path 34 with minimal insertion loss. Signal RF4 is directed from sampler 24 to signal processing stage 40, comprising an amplifier 44, a phase shifter 48, and an RF sampler 52. Sample signal RF4 is transformed by amplifier 44 into amplified sample signal SA, which then is transformed into phase shifted signal PS by phase shifter 48. Signal PS then is provided to input port 56 of sampler 52. Samplers which may be incorporated in the present include Merrimac Model C-114 and Model CBF-20A-1250 directional couplers. Examples of phase shifters suitable for use in conjunction with the present invention include Merrimac PEF-03A Series and PEP-4S Series phase shifters. By way of example, amplifier 44 may be implemented as an ENI 604LM amplifier.

An RF signal to be detected, such as signal RF5, is directed along propagation path 34 to port 36 of circulator 32 and is substantially output as signal RF6 from port 38. The signal RF6 is directed along propagation path 60 to input port 64 of sampler 52. The sampler superimposes signals PS and RF6 together to provide signal RF7 from output port 68 which is then directed along propagation path 72 to a receiver 80. The phase angle of signal PS is shifted by phase shifter 48 so that it is generally 180 degrees out of phase with respect to the phase angle of signal RF6 (and hence RF1) so that signals RF6 and PS generally cancel each other out at sampler 52. Amplifier 44 and phase shifter 48 amplify and phase shift, respectively, the sampled signal RF4 so that the phase and amplitude characteristics of signal PS greatly attenuate any components of signal RF1 that may be present in signal RF6 to essentially isolate signal characteristics from RF1 that would otherwise interfere with signal RF7. Ports 25 and 53 of samplers 24 and 52, respectively, are coupled to ground through RF loads 47, which may for example, each have an impedance of 50 ohms, to inhibit any significant RF power leakage through the samplers. Thus, it may be appreciated that signal RF7 is essentially equivalent to signal RF5 with minimal, if any interference from signal RF1.

Figure 2:
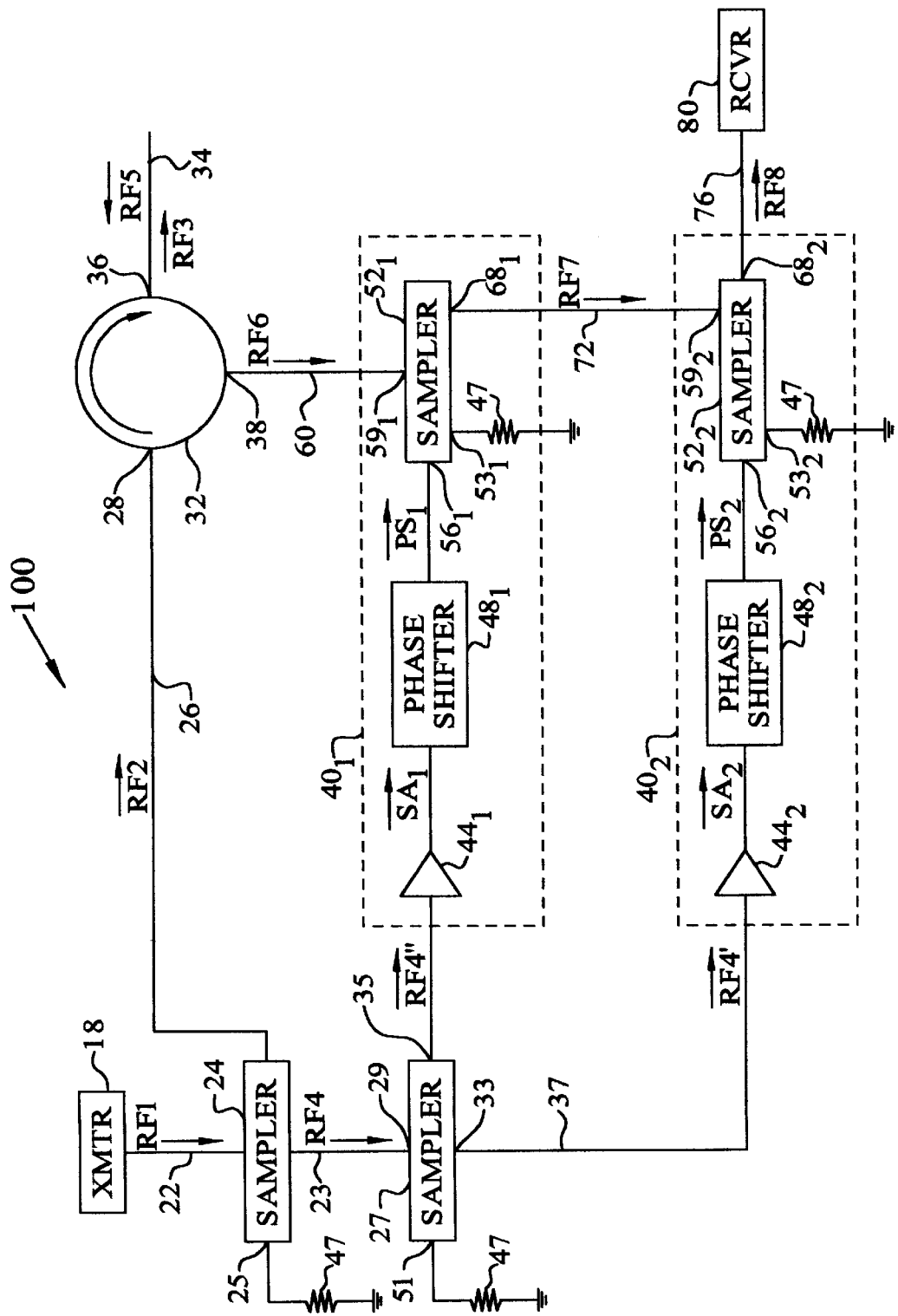
FIG. 2 is a block diagram of a wideband high isolation circulator network which includes multiple signal processing stages.

FIG. 2 shows another embodiment of a wideband high isolation circulator network 100 that includes two signal processing stages $40_1$ and $40_2$. The use of multiple signal processing stages improves the RF isolation between signal RF1 and RF5 compared to embodiments of the invention that employ fewer signal processing stages. Each stage $40_i$ (where i represents a particular stage) reduces the interference between signals RF1 and RF5 in the range of about 10 to 30 db, depending on the phase accuracy of signals $PS_i$, with respect to the phase of signal RF1.

Referring to FIG. 2, there is shown a wideband high isolation circulator network 100 which includes multiple signal processing stages $40_i$, where i may be a positive integer representing a particular signal processing stage. By way of example, network 100 is shown and described purposes of illustration as having two signal processing stages $40_1$ and $40_2$. However, it is to be understood that network 100 may include any m number of signal processing stages, where m is a positive integer, and m>1. The network 100 includes a sampler 24 which divides a radio frequency (RF) input signal RF1, generated by transmitter 18, into signals RF2 and sample signal RF4. Signal RF1 is directed along propagation path 22 to sampler 24. Preferably the amplitude of signal RF2 is much greater than the amplitude of signal RF4. Signal RF2 is directed along propagation path 26 to input port 28 of circulator 32. Circulator 32 outputs signal RF2 as signal RF3 through port 36 along propagation path 34 with minimal insertion loss. Sampled signal RF4 is directed along propagation path 23 to input port 29 of sampler 27. The sampler splits the power of signal RF4 into signals RF4' and RF4". In most applications, the amplitude ratio of RF4'/RF4" is on the order of about 20 db. Signal RF4" is directed from output port 35 of sampler 27 along propagation path 31 to signal processing stage $40_1$ which comprises amplifier $44_1$, phase shifter $48_1$, and RF sampler $52_1$. Signal RF4" is transformed by amplifier $44_1$ into amplified sample signal $SA_1$, which then is transformed into phase shifted signal $PS_1$ by phase shifter $48_1$. The phase angle of signal $PS_1$ is shifted by phase shifter 48 so that it is approximately 180 degrees out of phase with respect to the phase angle of signal RF6 (and hence RF1) so that signals RF6 and PS1 generally cancel each other out at sampler $52_1$. Signal $PS_1$ then is provided to input port 56 of sampler $52_1$.

Signal RF4' is output from port 33 of sampler 27 and is directed along propagation path 37 to signal processing stage $40_2$, comprising amplifier $44_2$, phase shifter $48_2$, and RF sampler $52_2$. Signal RF4' is transformed by amplifier $44_2$ into amplified sample signal $SA_2$, which then is transformed into phase shifted signal $PS_2$ by phase shifter $48_2$. The phase angle of signal $PS_2$ is shifted by phase shifter $48_2$ so that it is generally 180 degrees out of phase with respect to the phase angle of signal RF7 (and hence RF1) so that signals RF7 and $PS_2$ generally cancel each other out at sampler $52_2$. Signal $PS_2$ then is provided to input port $56_2$ of sampler $52_2$.

An RF signal to be detected, such as signal RF5, is directed along propagation path 34 to port 36 of circulator 32 and is substantially output as signal RF6 from port 38. The signal RF6 is directed along propagation path 60 to input port $59_1$ of sampler $52_1$. The sampler $52_1$ superimposes signals $PS_1$ and RF6 together to provide signal RF7 from output port $68_1$ of sampler $52_1$. Amplifier $44_1$ and phase shifter $48_1$ amplify and phase shift, respectively, the sampled signal RF4" so that the phase and amplitude characteristics of signal $PS_1$ greatly attenuate any components of signal RF1 that may be present in signal RF6. Ports 25 and 51 of samplers 24 and 27, respectively, and ports $53_1$ and $53_2$ of samplers $52_1$ and $52_2$, respectively, are coupled to ground through RF loads 47, which may for example, each have an impedance of 50 ohms, to inhibit any significant RF power leakage through the samplers. The signal RF7 may then be directed along propagation path 72 to signal processing stage $40_2$.

In signal processing stage $40_2$, amplifier $44_2$ amplifies and transforms signal RF4' into amplified signal $SA_2$. Then, phase shifter $48_2$ transforms signal $SA_2$ into a new signal $PS_2$ having a phase angle generally about 180 degrees out of phase with respect to the phase angle of signal RF7 (and hence RF1) so that signals RF7 and $PS_2$ substantially if not completely, cancel each other out at sampler $52_2$. Then sampler $52_2$ receives signals $PS_2$ and RF7 through ports 56 and 59, respectively. The sampler $52_2$ superimposes signals $PS_2$ and RF7 onto each other to create signal RF8 which is output from port $68_2$ of sampler $52_2$. The signal RF8 may be directed along propagation path 76 to receiver 80. By appropriately amplifying and adjusting the phase angle of RF4' with respect to the phase angle of signal RF1, signals $PS_2$ and RF7 destructively interfere so that any components of signal RF1 that would otherwise be present in signal RF8 are so attenuated, that signal RF8 is essentially isolated from signal RF1. Alternatively stated, signal $RF_8$ is essentially equivalent to signal RF5 with minimal, if any interference from signal RF1.

Obviously, many modifications and variations of the present invention are possible in light of the above teachings. Therefore, it is to be understood that within the scope of the appended claims, the invention may be practiced otherwise than as specifically described.

What is claimed is:

1. A wideband high isolation circulator network, comprising:
   a first sampler for dividing a first signal into second and third signals;
   a circulator for receiving said second signal through a first port, for outputting a fourth signal and receiving a fifth signal through a second port, and for outputting a sixth signal through a third port which represents the vector sum of samples of said second and fifth signals; and
   a signal processing stage which generates a seventh signal having amplitude and phase characteristics representing said fifth signal by canceling samples of said second signal present in said sixth signal in response to receiving said third and sixth signals.

2. The network of claim 1 wherein said signal processing stage includes:
   an amplifier for transforming said third signal into an amplified signal;
   a phase shifter for transforming said amplified signal into a phase shifted signal which is about 180 degrees out of phase with respect to said first signal; and
   a second sampler for generating said seventh signal by superimposing said phase shifted signal and said sixth signal onto each other.

3. The network of claim 1 further including a transmitter for generating said first signal.

4. The network of claim 1 further including a receiving for detecting said seventh signal.

5. The network of claim 1 wherein each of said signal processing stages includes:
   an amplifier for transforming a sample of said third signal into an amplified signal;
   a phase shifter for transforming said amplified signal into a phase shifted signal which is about 180 degrees out of phase with respect to said first signal; and
   a second sampler for superimposing said phase shifted signal and a sample of said sixth signal.

6. A wideband high isolation circulator network, comprising:

a first sampler for dividing a first signal into second and third signals;

a circulator having first, second and third ports for receiving said second signal through said first port, outputting a fourth signal through said second port, receiving a fifth signal through said second port, and outputting a sixth signal representing a vector sum of samples of said second and fifth signals through said third port; and a group of m signal processing stages for generating a seventh signal having amplitude and phase characteristics representing said fifth signal by canceling samples of said second signal present in said sixth signal in response to receiving samples of said third and sixth signals, where m is a positive integer and m>1.

7. The network of claim 5 further including a transmitter for generating said first signal.

8. The network of claim 5 further including a receiving for detecting said seventh signal.

9. A method for isolating an interfering RF signal from a received RF signal, comprising the steps of:

dividing an interfering RF input signal from a first source into first and second interfering signals;

superimposing a received RF input signal from a second source and said first interfering signal to generate a first superimposed signal;

amplifying and phase shifting said second interfering signal by about 180 degrees with respect to the phase of said interfering RF input signal to create a phase shifted interfering signal;

superimposing said phase shifted interfering signal and said first superimposed signal to generate a second superimposed signal that represents said received RF input signal and is substantially isolated from said interfering RF input signal.

10. The method of claim 9 further including the step of transmitting said interfering RF input signal.

11. The network of claim 9 further including the step of receiving said second superimposed signal.

* * * * *